US011385795B2

(12) United States Patent
Freyensee et al.

(10) Patent No.: US 11,385,795 B2
(45) Date of Patent: Jul. 12, 2022

(54) METHOD AND APPARATUS TO ENABLE INDIVIDUAL NON VOLATILE MEMORY EXPRESS (NVME) INPUT/OUTPUT (IO) QUEUES ON DIFFERING NETWORK ADDRESSES OF AN NVME CONTROLLER

(71) Applicant: Intel Corporation, Santa Clara, CA (US)

(72) Inventors: James P. Freyensee, Hillsboro, OR (US); Phil C. Cayton, Warren, OR (US); Dave B. Minturn, Hillsboro, OR (US); Jay E. Sternberg, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 596 days.

(21) Appl. No.: 16/381,994

(22) Filed: Apr. 11, 2019

(65) Prior Publication Data

US 2019/0303003 A1    Oct. 3, 2019

Related U.S. Application Data

(63) Continuation of application No. 14/976,949, filed on Dec. 21, 2015, now Pat. No. 10,275,160.

(51) Int. Cl.
*G06F 3/06* (2006.01)

(52) U.S. Cl.
CPC ............ *G06F 3/061* (2013.01); *G06F 3/0655* (2013.01); *G06F 3/0656* (2013.01); *G06F 3/0688* (2013.01)

(58) Field of Classification Search
CPC ........ G06F 3/061; G06F 3/0655; G06F 3/056; G06F 3/0688; G06F 12/00; G06F 13/00
See application file for complete search history.

(56) References Cited

U.S. PATENT DOCUMENTS

| 5,396,637 A | 3/1995 | Harwell et al. |
| 5,603,038 A | 2/1997 | Crump et al. |

(Continued)

FOREIGN PATENT DOCUMENTS

| CN | 104572516 A | 4/2015 |
| CN | 102959525 A | 7/2016 |

(Continued)

OTHER PUBLICATIONS

First Chinese Office Action of P.R. China State Intellectual Property Office for Patent Application No. 201680067899.6, dated May 19, 2021, 11 pages.

(Continued)

*Primary Examiner* — Tuan V Thai
(74) *Attorney, Agent, or Firm* — Compass IP Law PC

(57) ABSTRACT

Methods and apparatus related to enabling individual NVMe (Non-Volatile Memory express) IO (Input Output or I/O) queues on differing network addresses of an NVMe controller are described. In one embodiment, a plurality of backend controller logic is coupled to a plurality of non-volatile memory devices. One or more virtual controller target logic (coupled to the plurality of backend controller logic) transmit data from a first portion of a plurality of IO queues to a first backend controller logic of the plurality of the backend controller logic. The one or more virtual controller target logic transmit data from a second portion of the plurality of IO queues to a second backend controller logic of the plurality of backend controller logic. Other embodiments are also disclosed and claimed.

20 Claims, 9 Drawing Sheets

(56) References Cited

U.S. PATENT DOCUMENTS

| | | |
|---|---|---|
| 5,809,526 A | 9/1998 | Patel |
| 5,860,083 A | 1/1999 | Sukegawa |
| 5,978,924 A | 11/1999 | Ahn |
| 6,393,518 B2 | 5/2002 | Koivuniemi |
| 6,523,102 B1 | 2/2003 | Dye et al. |
| 6,535,996 B1 | 3/2003 | Brewer et al. |
| 6,968,424 B1 | 11/2005 | Danilak |
| 7,146,455 B2 | 12/2006 | Cheng |
| 7,260,695 B2 | 8/2007 | Batchelor et al. |
| 7,437,597 B1 | 10/2008 | Kruckemyer et al. |
| 7,653,699 B1 | 1/2010 | Colgrove et al. |
| 7,716,525 B1 | 5/2010 | Buchko et al. |
| 7,802,145 B1 | 9/2010 | Bainbridge et al. |
| 7,954,006 B1 | 5/2011 | Mangipudi |
| 8,069,309 B1 | 11/2011 | Long |
| 8,325,554 B2 | 12/2012 | Sweere et al. |
| 8,510,598 B2 | 8/2013 | Vedder et al. |
| 8,612,676 B2 | 12/2013 | Dahlen et al. |
| 8,966,164 B1 | 2/2015 | Asnaashari et al. |
| 10,013,168 B2 | 7/2018 | Cayton et al. |
| 10,176,116 B2 | 1/2019 | Sternberg et al. |
| 10,200,376 B2 | 2/2019 | Cayton et al. |
| 10,620,840 B2 | 4/2020 | Freyensee et al. |
| 10,893,050 B2 | 1/2021 | Cayton et al. |
| 10,970,231 B2 | 4/2021 | Sternberg et al. |
| 2002/0095602 A1 | 7/2002 | Pherson et al. |
| 2003/0191734 A1 | 10/2003 | Voigt |
| 2006/0015683 A1 | 1/2006 | Ashmore et al. |
| 2006/0126833 A1 | 6/2006 | O'leary et al. |
| 2006/0138231 A1 | 6/2006 | Elberbaum |
| 2006/0274566 A1 | 12/2006 | Takashima et al. |
| 2007/0124604 A1 | 5/2007 | Feldstein et al. |
| 2007/0229521 A1 | 10/2007 | Li et al. |
| 2007/0294543 A1 | 12/2007 | Chiang |
| 2009/0172372 A1 | 7/2009 | Kumar et al. |
| 2009/0182962 A1 | 7/2009 | Khmelnitsky et al. |
| 2009/0254705 A1 | 10/2009 | Abali et al. |
| 2009/0271563 A1 | 10/2009 | Gopalan et al. |
| 2009/0313416 A1 | 12/2009 | Nation |
| 2010/0001155 A1 | 1/2010 | Kitagawa |
| 2010/0011261 A1 | 1/2010 | Cagno et al. |
| 2010/0080057 A1 | 4/2010 | Reuter et al. |
| 2010/0095053 A1 | 4/2010 | Bruce et al. |
| 2010/0114889 A1 | 5/2010 | Rabii et al. |
| 2010/0198972 A1 | 8/2010 | Umbehocker |
| 2010/0202240 A1 | 8/2010 | Moshayedi et al. |
| 2011/0161748 A1 | 6/2011 | Casper et al. |
| 2011/0231594 A1 | 9/2011 | Sugimoto et al. |
| 2011/0321123 A1 | 12/2011 | Ishikawa |
| 2012/0047314 A1 | 2/2012 | Chen et al. |
| 2012/0096332 A1 | 4/2012 | Furno et al. |
| 2012/0166891 A1 | 6/2012 | Dahlen et al. |
| 2012/0198136 A1 | 8/2012 | Moshayedi et al. |
| 2012/0271990 A1 | 10/2012 | Chen et al. |
| 2013/0019048 A1 | 1/2013 | Bland et al. |
| 2013/0019076 A1 | 1/2013 | Amidi et al. |
| 2014/0068200 A1 | 3/2014 | Schnapp et al. |
| 2014/0189203 A1* | 7/2014 | Suzuki ............... G06F 12/0868 711/103 |
| 2014/0201562 A1 | 7/2014 | Breakstone et al. |
| 2014/0281040 A1 | 9/2014 | Liu |
| 2014/0304461 A1 | 10/2014 | Kitahara et al. |
| 2015/0089287 A1 | 3/2015 | Jayakumar et al. |
| 2015/0095554 A1 | 4/2015 | Asnaashari et al. |
| 2015/0134880 A1 | 5/2015 | Danilak et al. |
| 2015/0143134 A1 | 5/2015 | Hashimoto |
| 2015/0212734 A1* | 7/2015 | Asnaashari ............ G06F 3/067 711/103 |
| 2015/0248366 A1* | 9/2015 | Bergsten ................ G06F 3/067 710/308 |
| 2015/0319237 A1 | 11/2015 | Hussain et al. |
| 2015/0319243 A1 | 11/2015 | Hussain et al. |
| 2016/0085718 A1 | 3/2016 | Huang |
| 2016/0188414 A1 | 6/2016 | Jayakumar et al. |
| 2017/0123656 A1* | 5/2017 | Benisty ................. G06F 3/0688 |
| 2017/0177216 A1 | 6/2017 | Freyensee et al. |
| 2017/0185310 A1 | 6/2017 | Cayton et al. |
| 2018/0004559 A1 | 1/2018 | Geml et al. |
| 2018/0088978 A1 | 3/2018 | Li et al. |
| 2018/0188974 A1 | 7/2018 | Cayton et al. |
| 2018/0260148 A1 | 9/2018 | Klein |

FOREIGN PATENT DOCUMENTS

| | | |
|---|---|---|
| KR | 20140142530 A | 12/2014 |
| TW | I225589 B | 12/2004 |
| TW | 201118546 A | 6/2011 |
| WO | 03060716 A1 | 7/2003 |
| WO | 2006039711 A1 | 4/2006 |
| WO | 2015041698 A1 | 3/2015 |
| WO | 2015080690 A1 | 6/2015 |
| WO | 2016105814 A1 | 6/2016 |
| WO | 2017112021 A1 | 6/2017 |
| WO | 2017112285 A1 | 6/2017 |
| WO | 2018038840 A2 | 3/2018 |

OTHER PUBLICATIONS

Christie, M., et al., "Red Hat Enterprise Linux 5 Online Storage Reconfiguration Guide", Red Hat Enterprise Linux 5, Edition 1, © 2008, 43 pp.

International Preliminary Report on Patentability for International Application No. PCT/US2017/029982, dated Dec. 6, 2018, 11 pp.

International Search Report and Written Opinion for International Application No. PCT/US2017/029982, dated Jul. 28, 2017, 14 pp.

International Search Report and Written Opinion for International Application No. PCT/US2017/043568, dated Oct. 20, 2017, 15 pp.

Marks, K., "An NVM Express Tutorial", Flash Memory Summit 2013, 92 pp.

Minturn, D., "NVM Express Over Fabrics", Mar. 15-18, 2015, NVM Express, Total 13 pp.

Notice of Allowance for U.S. Appl. No. 16/240,705, dated Dec. 1, 2020, 10 pages.

NVM Express, Inc., "NVM Express Over Fabrics", Revision 1.0, Jun. 5, 2106, © 2007-2016, Total 49 pp.

Onufryk, P., "What's New in NVMe 1.1 and Future Directions", NVM Express, Flash Memory Summit 2013, Santa Clara, CA, Total 26 pp.

Sardella, S., "NVMe Over Fabrics Agenda", Aug. 11, 2015, NVM Express, Total 14 pp.

Wikipedia, "Internet Storage Name Service", [online], last modified on Aug. 12, 2016, [Retrieved on Sep. 18, 2016], retrieved from the Internet at, 2 pp.

"Intel Xeon Processor C550/C3500 Series-based Platform for Storage Applications" 2010, 6 pages, Intel Corporation, USA.

"NVM Express" retrieved from http://www.nvmexpress.org on Nov. 8, 2015, 2 pages.

"NVM Express", specification, Oct. 23, 2015, 209 pages, revision 1.2a, NVM Express, Inc., Wakefield, MA.

"PCI Express Base Specification", Specification, Nov. 10, 2010, 860 pages, Revision 3.0, PCI-SIG, Beaverton, OR.

Advisory Action for U.S. Appl. No. 14/976,949, dated May 3, 2018, 4 pages.

Final Office Action for U.S. Appl. No. 14/976,949, dated Dec. 13, 2017, 28 pages.

First Office Action for U.S. Appl. No. 14/976,949, dated Jun. 16, 2017, 25 pages.

International Preliminary Report on Patentability received for International Application No. PCT/US2011/061466, dated Jun. 25, 2013, 5 pages.

International Preliminary Report on Patentability received for International Application No. PCT/US2015/062555, dated Jul. 6, 2017, 8 pages.

International Preliminary Report on Patentability, received for International Patent Application No. PCT/US2013/061188, dated Mar. 29, 2016, 6 pages.

(56) References Cited

OTHER PUBLICATIONS

International Search Report and Written Opinion received for International Application No. PCT/US2011/061466, dated Jul. 31, 2012, 7 pages.
International Search Report and Written Opinion received for International Application No. PCT/US2013/061188, dated Jun. 20, 2014, 10 pages.
International Search Report and Written Opinion received for International Application No. PCT/US2015/062555, dated Mar. 15, 2016, 11 pages.
International Search Report and Written Opinion received for International Application No. PCT/US2016/055226, dated Jan. 19, 2017, 13 pages.
International Search Report and Written Opinion received for International Application No. PCT/US2016/063551, dated Mar. 13, 2017, 11 pages.
Notice of Allowance received for U.S. Appl. No. 12/976,545, dated Aug. 15, 2013, 7 pages.
Office Action and Search Report received for Taiwanese Patent Application No. 104138741, dated Oct. 19, 2016, 8 pages including 1 page of English translation.
Office Action received for Taiwanese Patent Application No. 104138741, dated Mar. 16, 2017, 5 pages.
Office Action received for U.S. Appl. No. 12/976,545, dated Apr. 12, 2013, 8 pages.
Office Action received for U.S. Appl. No. 12/976,545, dated Dec. 5, 2012, 9 pages.
Office Action received for U.S. Appl. No. 14/127,548, dated Jul. 17, 2015, 9 pages.
Office Action received for U.S. Appl. No. 14/583,037, dated Feb. 24, 2017, 7 pages.
Office Action received for U.S. Appl. No. 14/583,037, dated May 19, 2016, 6 pages.
Office Action received for U.S. Appl. No. 14/583,037, dated Nov. 4, 2016, 6 pages.
Second Office Action for U.S. Appl. No. 14/976,949, dated Jun. 4, 2018, 29 pages.
Second Chinese Office Action of P.R. China State Intellectual Property Office for Patent Application No. 201680067899.6, dated Oct. 15, 2021, 3 pages.

* cited by examiner

US 11,385,795 B2

METHOD AND APPARATUS TO ENABLE INDIVIDUAL NON VOLATILE MEMORY EXPRESS (NVME) INPUT/OUTPUT (IO) QUEUES ON DIFFERING NETWORK ADDRESSES OF AN NVME CONTROLLER

RELATED APPLICATIONS

This application is a continuation and claims priority under 35 U.S.C. § 120 of pending U.S. patent application Ser. No. 14/976,949, filed Dec. 21, 2015, entitled METHOD AND APPARATUS TO ENABLE INDIVIDUAL NON VOLATILE MEMORY EXPRESS (NVMe) INPUT/OUTPUT (10) QUEUES ON DIFFERING NETWORK ADDRESSES OF AN NVMe CONTROLLER. The entire disclosure(s) of these documents are incorporated by reference herein for all purposes.

FIELD

The present disclosure generally relates to the field of electronics. More particularly, some embodiments generally relate to enabling individual NVMe (Non-Volatile Memory Express) Input Output ("IO" or "I/O") queues on differing network addresses of an NVMe controller.

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during the run-time of the program. On the other hand, persistent data structures stored in non-volatile (or persistent memory) are available beyond the run-time of a program and can be reused.

As computing capabilities are enhanced in processors, one concern is the speed at which memory may be accessed by a processor. For example, to process data, a processor may need to first fetch data from a memory. After completion of the data processing, the results may need to be stored in the memory. Therefore, the memory access speed can have a direct effect on overall system performance.

Another important consideration is power consumption. For example, in mobile computing devices that rely on battery power, it is very important to reduce power consumption to allow for the device to operate while mobile. Power consumption is also important for non-mobile computing devices (such as computer servers, e.g., used in a data center, etc.) as excess power consumption may increase costs (e.g., due to additional power usage, increased cooling requirements, etc.), shorten component life, limit locations at which a device may be used, etc.

Yet another important consideration is reliability of the executing storage solution, as a mechanical disk drive has a motor and disk head(s) that can break down, whereas a SSD (Solid State Drive) has no mechanical moving parts and can more readily survive accidental bumps and movements.

To this end, some computing devices are increasingly utilizing SSDs to provide Non-Volatile Memory (NVM) storage solutions.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
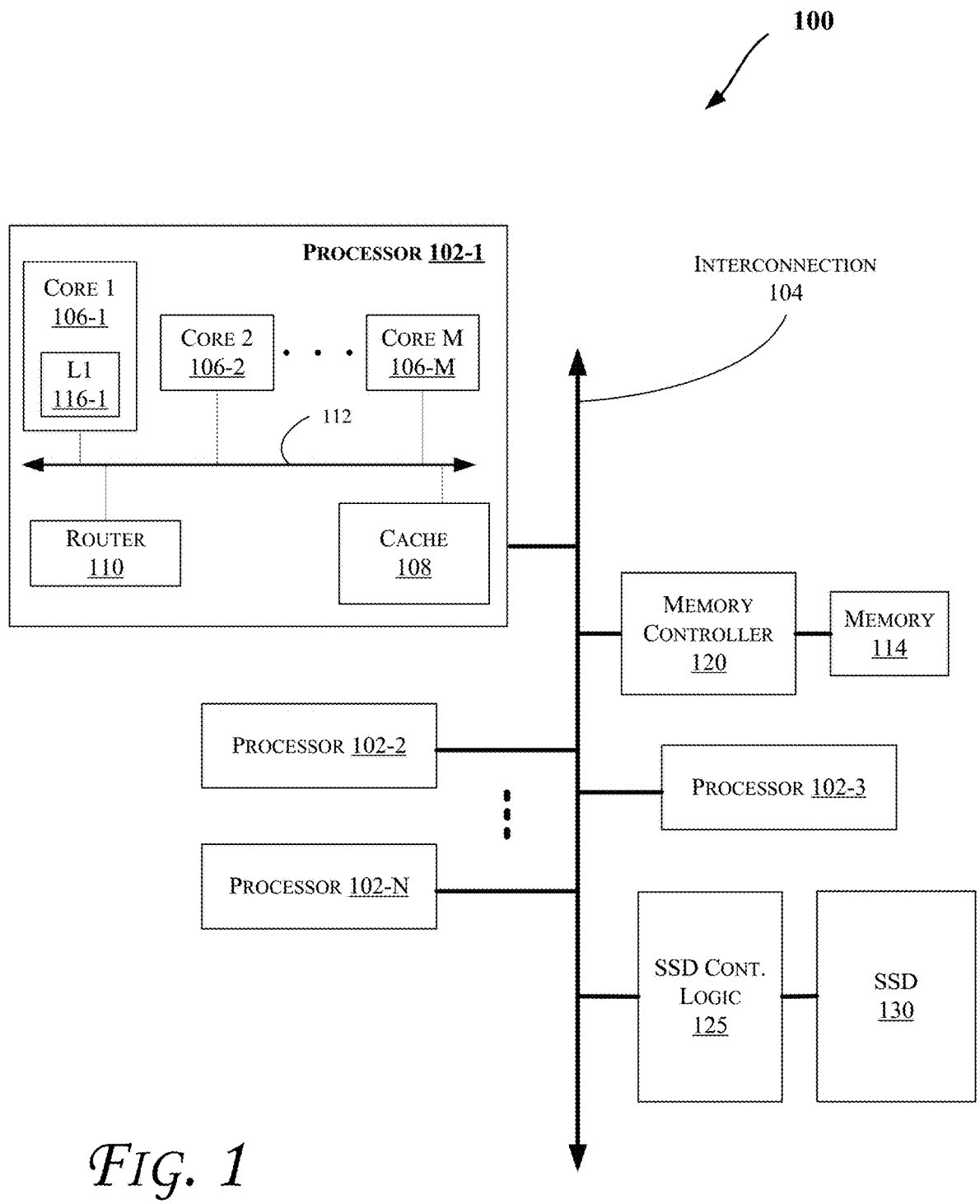
FIGS. 1 and 4-6 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As discussed above, some computing systems may utilize NVM devices. One type of Non-Volatile Memory (NVM) is provided in accordance with the NVMe (Non-Volatile Memory Express) Specification (such as NVM Express Specification, Revision 1.2a, Oct. 23, 2015). The NVMe specification defines various items (such as a register interface, command set, and feature set) to allow access to Solid State Drives (SSDs) that connect to a computer through a Peripheral Component Interconnect Express (PCIe) bus (e.g., in accordance with the PCI Express Base Specification, Revision 3.1, November 2014, etc.).

To this end, some embodiments relate to method and apparatus to enable individual NVMe (Non-Volatile Memory express) IO (Input Output or I/O) queues on differing network addresses of an NVMe controller. For example, network storage solutions can be improved by allowing access to a plurality of NVMe devices (which may be coupled over a computer network) via a single (e.g., virtual or physical) NVMe controller.

More specifically, in some NVMe implementations, NVMe queues are tied to controllers of physical NVMe devices, and the NVMe queues created in device driver software may be tied to the NVMe queues implemented in a single hardware controller for a PCIe NVMe device. Despite this, network fabrics (such as RDMA (Remote Direct Memory Access)) do not necessarily need this constraint to implement NVMe queues for an NVMe controller to pass data. An embodiment can be applied to remove this relationship and create a higher abstraction level of NVMe queues with respect to the physical NVMe queues on an NVMe device. Thus, this higher abstraction NVMe target implementation may virtually support/provide a complete NVMe controller with some number of IO queues for that single controller, but in actuality a subset of those IO queues in that virtual representation may be mapped to one physical NVMe controller and its IO queues. Additionally, the rest of that subset may be mapped to another physical NVMe controller and its IO queues. Also, NVMe queues such as the admin (or administration) queue may be configured into a broadcast type configuration, e.g., controlling multiple NVMe controllers in a vast NVMe storage data network.

Hence, some embodiments allow remote access to a virtual or physical storage controller via network connectivity at the NVMe queue level, as well as advertise configurable NVMe queue setups (e.g., whether the NVMe queue setups are static or dynamic). Even mechanisms that initialize or configure an NVMe network and its devices at the queue-level may be provided. Further, static and dynamic configurability and connectivity of NVMe queues between distinct controller hosts, virtual or physical controller targets, and physical storage media for redundancy, performance optimization, and/or other yet-to-be-discovered benefits may be provided.

Furthermore, even though some embodiments are generally discussed with reference to Non-Volatile Memory (NVM) or NVMe, embodiments are not limited to a single type of NVM and non-volatile memory of any type or combinations of different NVM types (e.g., in a format such as a Solid State Drive (or SSD, e.g., including NAND and/or NOR type of memory cells) or other formats usable for storage such as a memory drive, flash drive, etc.) may be used. The storage media (whether used in SSD format or otherwise) can be any type of storage media including, for example, one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), etc. Also, any type of Random Access Memory (RAM) such as Dynamic RAM (DRAM), backed by a power reserve (such as a battery or capacitance) to retain the data, may be used. Hence, even volatile memory capable of retaining data during power failure or power disruption(s) may be used for storage in various embodiments.

The techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, smart bracelet, etc.), including those discussed with reference to FIGS. 1-6. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a processor cache 108 (which may be a shared cache or a private cache in various embodiments), and/or a router 110. The processor cores 106 may be implemented on a single integrated circuit (IC) chip. Moreover, the chip may include one or more shared and/or private caches (such as processor cache 108), buses or interconnections (such as a bus or interconnection 112), logic 120, memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The processor cache 108 may store data (e.g., including instructions) that are utilized by one or more components of the processor 102-1, such as the cores 106. For example, the processor cache 108 may locally cache data stored in a memory 114 for faster access by the components of the processor 102. As shown in FIG. 1, the memory 114 may be in communication with the processors 102 via the interconnection 104. In an embodiment, the processor cache 108 (that may be shared) may have various levels, for example, the processor cache 108 may be a mid-level cache and/or a last-level cache (LLC). Also, each of the cores 106 may include a level 1 (L1) processor cache (116-1) (generally referred to herein as "L1 processor cache 116"). Various components of the processor 102-1 may communicate with the processor cache 108 directly, through a bus (e.g., the bus 112), and/or a memory controller or hub.

As shown in FIG. 1, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

System 100 also includes Non-Volatile (NV) storage (or Non-Volatile Memory (NVM), such as NVM operating in accordance with an NVMe protocol for accessing NVM over PCIe) device such as an SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 1, logic 125 may communicate via a storage bus/interconnect (such as the SATA (Serial Advanced Technology Attachment) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 2 and 4-6), etc.). Additionally, logic 125 may be incorporated into memory controller logic (such as those discussed with reference to FIGS. 4-6) or provided on a same Integrated Circuit (IC) device in various embodiments (e.g., on the same IC device as the SSD 130 or in the same enclosure as the SSD 130). System 100 may also include other types of non-volatile storage such as those discussed with reference to FIGS. 4-6, including for example a hard drive, etc.

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein such as those discussed with reference to other figures including 4-6, for example), including the cores 106, interconnections 104 or 112, components outside of the processor 102, SSD 130, SSD bus, SATA bus, PCIe bus, logic 125, etc., to sense variations in various factors affecting power/thermal behavior of the system/platform, such as temperature, operating frequency, operating voltage, power consumption, and/or inter-core communication activity, etc.

Figure 1A:
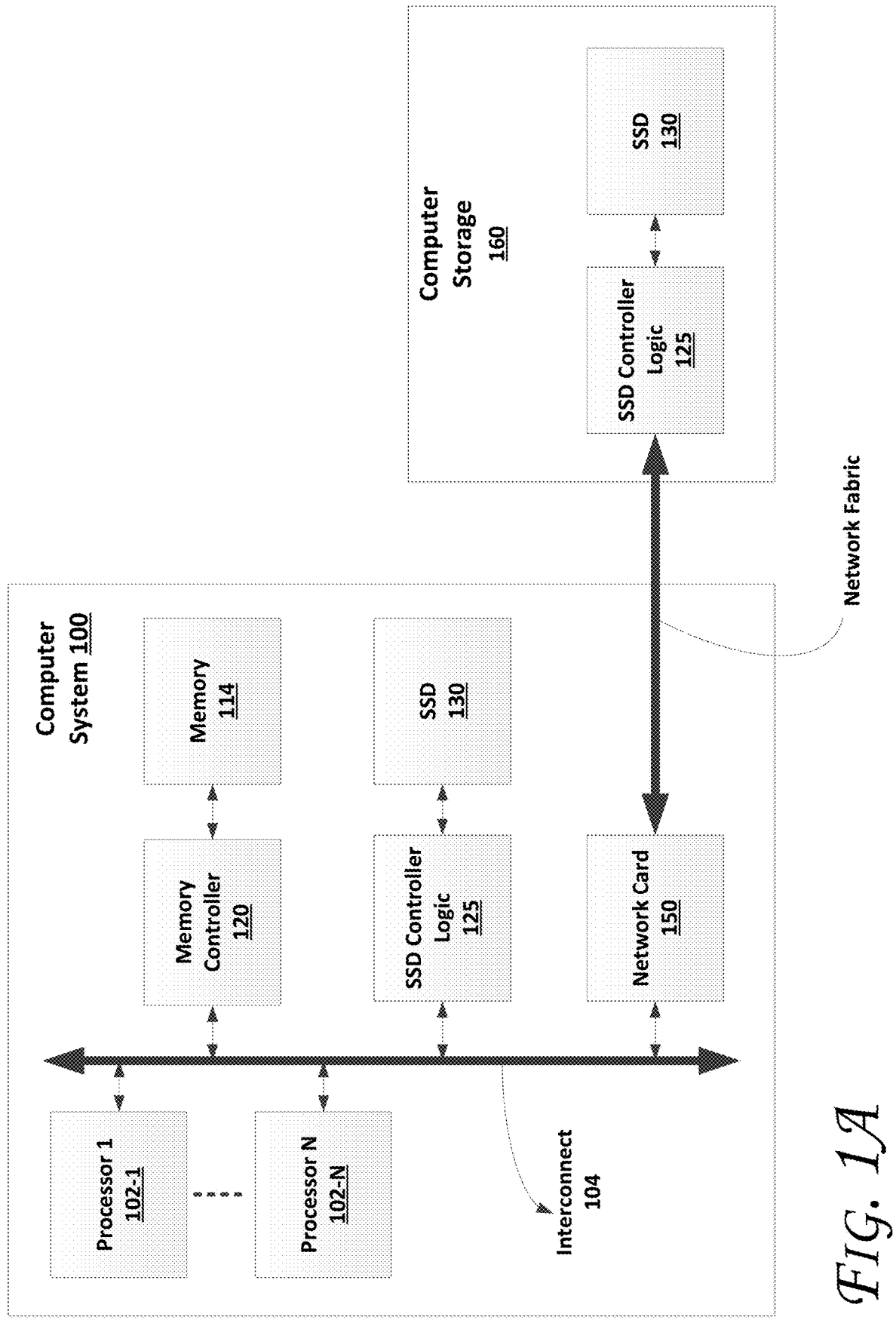
FIG. 1A illustrates another embodiment of the system of FIG. 1.

FIG. 1A illustrates another embodiment of the system 100 of FIG. 1. As shown in FIG. 1A, the SSD controller logic 125 may be coupled to a network fabric, for example, via an RDMA network technology (e.g., InfiniBand®) or Fibre Channel, Ethernet, OmniPath or Omni-Path (e.g., provided by Intel® Corporation), etc. More particularly, a computer storage 160 (including the logic 125 and SSD 130) is coupled via a network card 150 to interconnect 104 or system 100. The network card 150 may be any type of a network communication interface such as those discussed with reference to FIGS. 4, 5, and/or 6. Also, computer storage 160 may be provided in another computer system in an embodiment. Further, computer storage 160 may include (or otherwise have access to) a network card 150 to communicate over a network.

Figure 2:
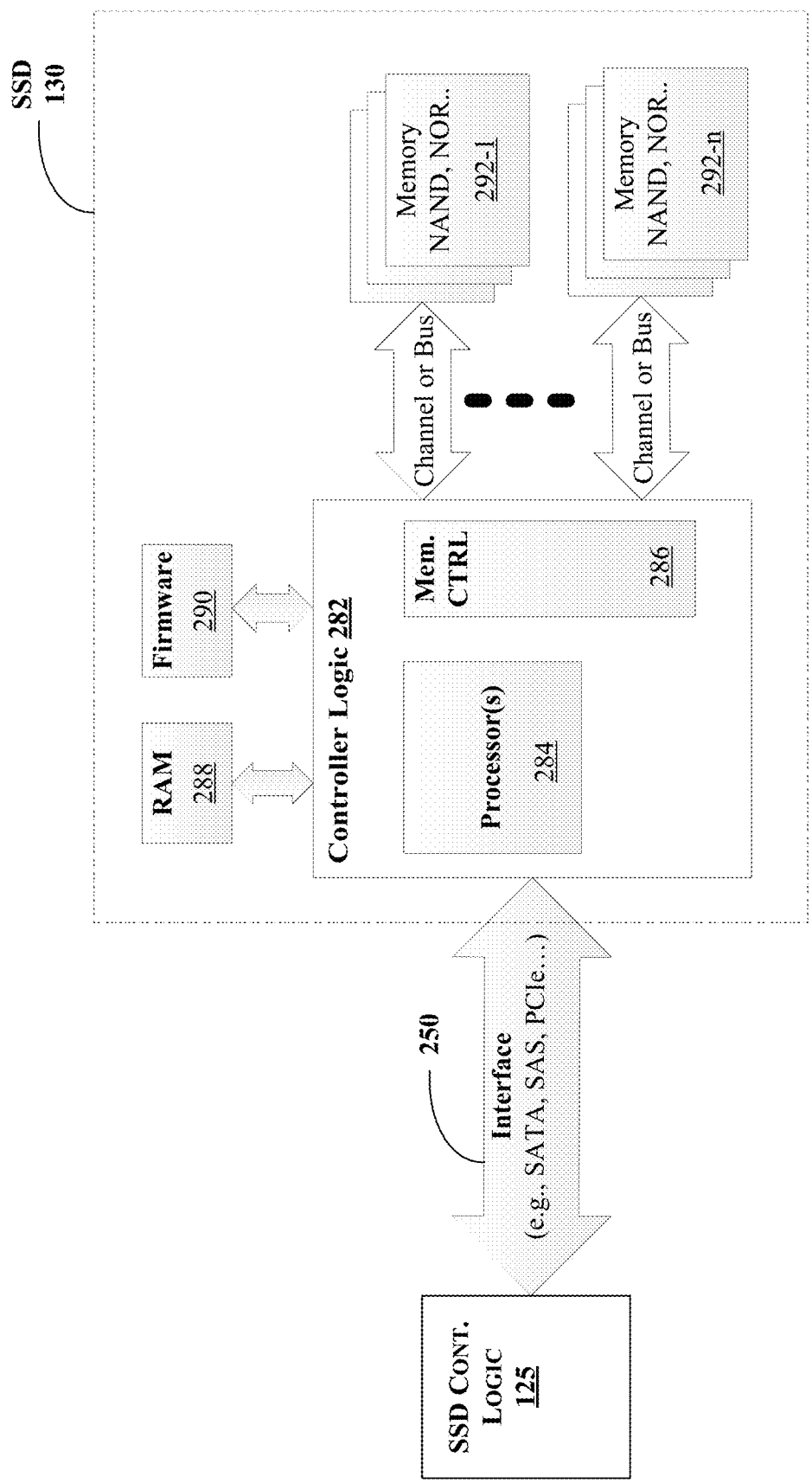
FIG. 2 illustrates a block diagram of various components of a solid state drive, according to an embodiment.

FIG. 2 illustrates a block diagram of various components of an SSD, according to an embodiment. While SSD controller logic 125 may facilitate communication between the SSD 130 and other system components via an interface 250 (e.g., SATA, SAS, PCIe, OmniPath, InfiniBand, etc.), a controller logic 282 facilitates communication between logic 125 and components inside the SSD 130 (or communication between components inside the SSD 130). Hence, in some embodiments, logic 125 is an optional external controller or a device driver that operates the SSD 130 As shown in FIG. 2, controller logic 282 includes one or more processor cores or processors 284 and memory controller logic 286, and is coupled to Random Access Memory (RAM) 288, firmware storage 290, and one or more memory modules or dies 292-1 to 292-n (which may include NAND flash, NOR flash, three dimensional cross point memory or other types of non-volatile memory). Logic 282 may also administer one or more IO queues such as those discussed with reference to FIGS. 3A-3C. Memory modules 292-1 to 292-n are coupled to the memory controller logic 286 via one or more memory channels or busses. One or more of the operations discussed with reference to FIGS. 1-6 may be performed by one or more of the components of FIG. 2, e.g., processors 284 and/or controller 282 may compress/decompress (or otherwise cause compression/decompression) of data written to or read from memory modules 292-1 to 292-n. Also, one or more of the operations of FIGS. 1-6 may be programmed into the firmware 290. Furthermore, in some embodiments, a hybrid drive may be used instead of the SSD 130 (where a plurality of memory modules/media 292-1 to 292-n is present such as a hard disk drive, flash memory, or other types of non-volatile memory discussed herein).

As mentioned above, some embodiments provide finer grained configuration control of data network bandwidths and/or connections at the NVMe queue level for novel network storage configurations, and even potential advantages in one or more of: performance, bandwidth, correctness, maintenance, dynamic on-demand adjustment for these qualities, and/or testing techniques. For example, NVMe over network fabrics may take a fabric agnostic approach in that any connection between hosts and targets (or targets to physical storage media) may utilize any supported network fabric type. Using this fabric technology allows a loose coupling of a specific NVMe queue to a physical NVMe controller, enabling the possibility of novel network configurations at the NVMe queue level instead of an NVMe controller level found on PCIe bus configurations inside a physical computer.

Moreover, a consumer of this type of configuration may still access an NVMe device via normal operating system entity, thinking it is accessing a single NVMe device through a single NVMe controller with a plurality of NVMe queues. But in reality, its data operations may be directed to multiple NVMe devices, e.g., via a mesh of interconnectivity of NVMe queues coupled between one NVMe controller representation (e.g., physical or virtual NVMe controller) and other NVMe controller representations (e.g., also physical or virtual).

Figure 3A:
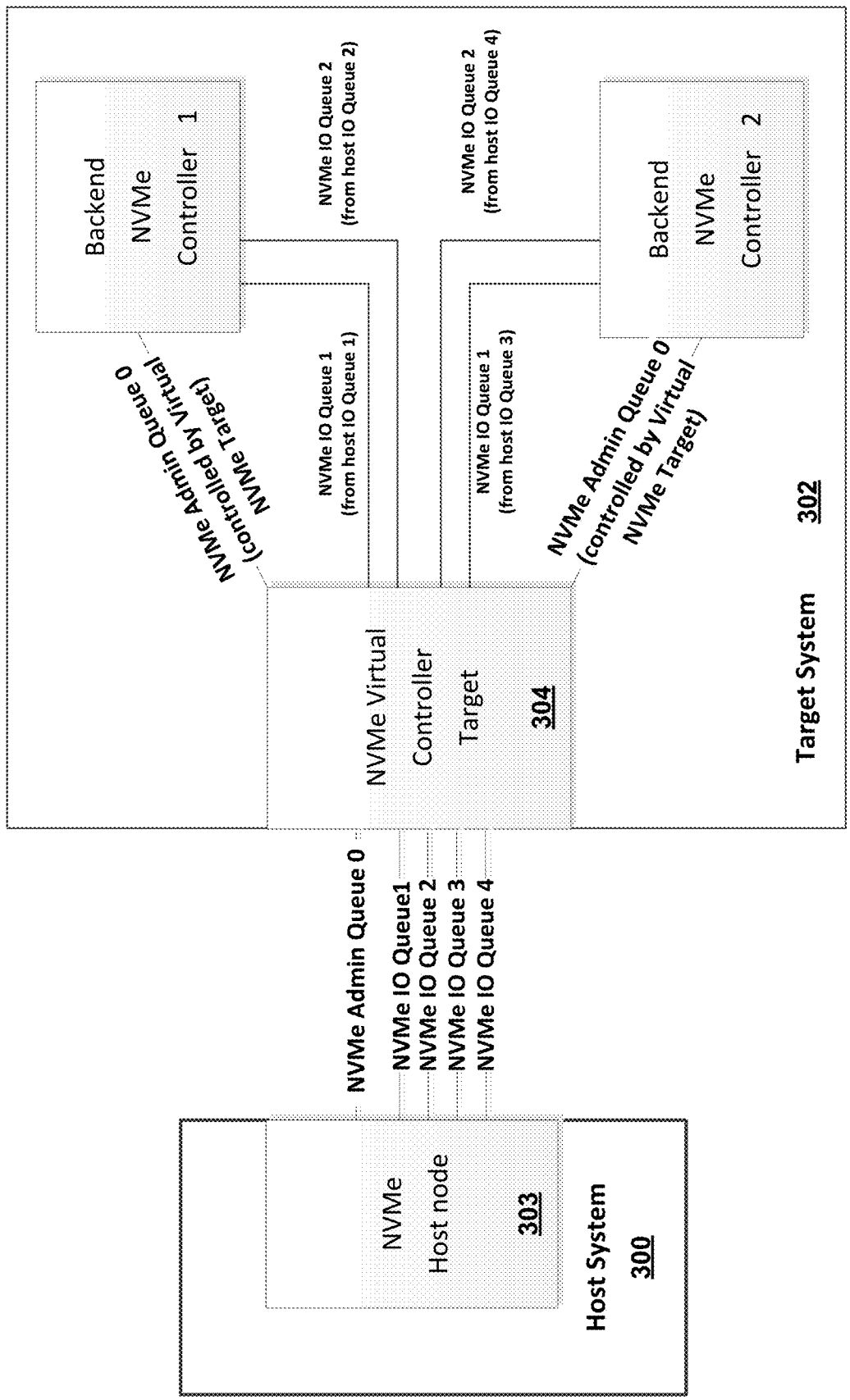
FIGS. 3A, 3B, and 3C illustrate various configurations for NVMe 10 queues, according to some embodiments.
Figure 3B:
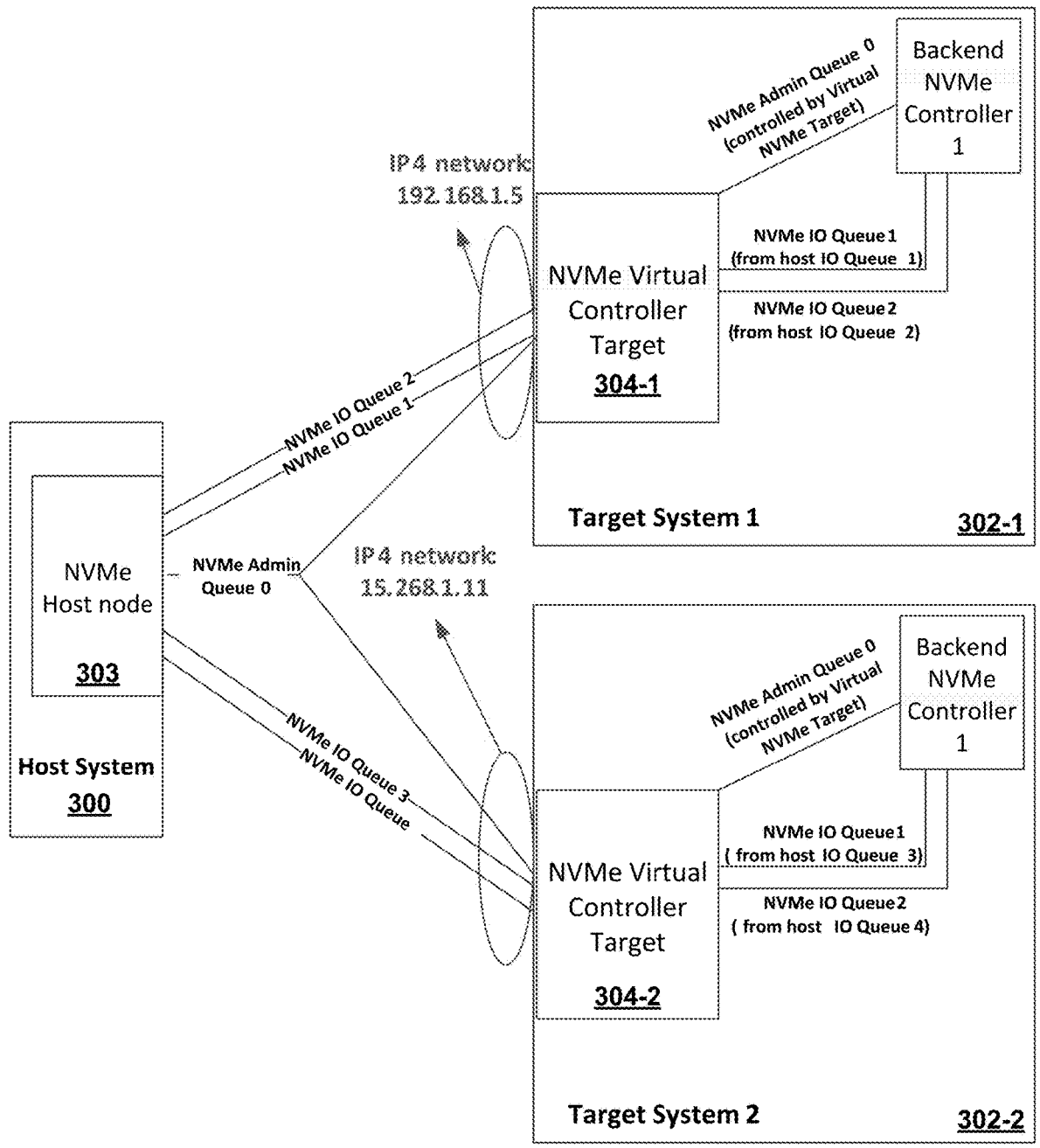
Figure 3C:
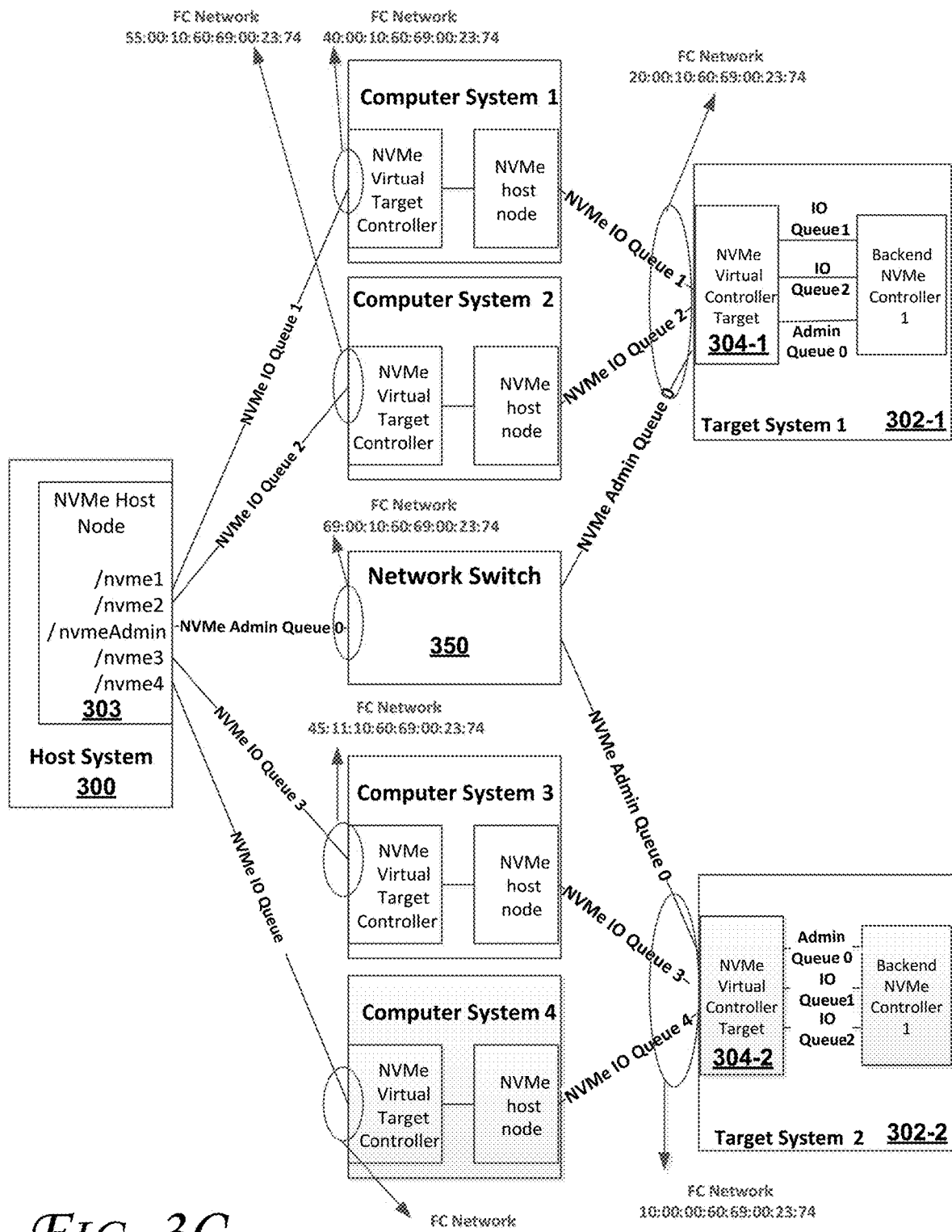

FIGS. 3A, 3B, and 3C illustrate various configurations for NVMe IO queues, according to some embodiments. Various components discussed herein (e.g., with reference to FIGS. 1, 2, 4, 5, and/or 6) may be used to perform the operations discussed with reference to FIGS. 3A, 3B, and 3C (including, for example, logic 125 and/or SSD 130).

Referring to FIG. 3A, IO queue network configuration for an NVMe virtual controller target is shown. As illustrated, a host system 300 communicates with a target system 302 via one or more queues (e.g., NVMe admin queue 0, one or more NVMe IO queues 1, 2, etc.) that couple an NVMe host node logic 303 to an NVMe virtual controller target logic 304). In some embodiments, one or more of NVMe host node logic (e.g., logic 303), NVMe virtual controller target logic and NVMe virtual target controller logic (e.g., logic 304, logic 304-1, and/or 304-2 discussed with reference to FIGS. 3A-3C), and/or backend NVMe controller logic may be provided as part of the logic 125 discussed herein with reference to FIGS. 1, 2, 4, 5, and/or 6. Hence, backend NVMe controllers 1 and 2 of FIGS. 3A-3C may be coupled to (or incorporated into) an SSD 130 such as discussed with reference to FIGS. 1, 2, 4, 5, and/or 6, and/or backend NVMe controllers 1 and 2 may be coupled to (or incorporated into) an SSD storage solution in which both NVMe backend controllers are part of a (e.g., single) physical SSD product (also called "dual-headed" SSD).

The host system 300 may expose one NVMe disk resource at the operating system level since it considers that only one NVMe controller is coupled to it. The NVMe virtual controller 304 may be configured to send/direct about half (or some other portion) of the IO queues to one NVMe controller (e.g., backend NVMe controller 1) and the remaining to another NVMe controller (e.g., backend NVMe controller 2). This also allows for data duplication and other features. Alternatively, the virtual controller 304 may configure the IO queue routing from one controller to another controller dynamically, e.g., if a controller is bandwidth constrained or the virtual controller 304 detects an IO queue associated with one controller is broken or otherwise not fully or partially functional (e.g., based on comparison with some threshold value).

FIG. 3A also shows sample host IO queues being selectively directed to one of two illustrated backend NVMe controllers 1 and 2. Also, NVMe administrative commands (such as Create Submission/Completion IO Queues, Identify Controller, etc.), may be sent from the NVMe virtual controller logic 304 to the backend NVMe controllers based on administrative queue information from the host. The virtual target may include logic to make decisions regarding which backend controller ultimately receives an admin command and how (e.g., operation mode such as point to point, broadcast, etc.) based on the operation mode for which the target is configured.

Referring to FIG. 3B, a configuration is shown for IO queue network with the NVMe host queue connection split amongst multiple NVMe targets residing on separate networks. In FIG. 3B, IPv4 (Internet Protocol version 4) address is shown for the sake of example, but any type of network fabric may be used in various embodiments, including for example Fibre Channel or Omnipath (or Omni-Path) fabric (e.g., provided by Intel® Corporation). Also, both target systems 1 and 2 (302-1 and 302-2) include a backend NVMe controller 1 designating that backend NVMe controller 1 is the first (or "1") NVMe storage device for each target system. However, each target system is not limited to a single physical backend NVMe controller and more than one backend NVMe controller may be provided for a target system.

As shown in FIG. 3B, the host system 300 only includes one NVMe host node logic 303 in this embodiment. Accordingly, the host has only one NVMe disk resource exposed at the OS level. Its NVMe queues are set up in a broadcast-like configuration, e.g., with two IO queues going to an NVMe target and the one NVMe admin queue being broadcast to both targets. In an embodiment, there may be logic in the NVMe host to deal with separate completion packets received from multiple NVMe targets for a single NVMe admin submission packet.

The virtual NVMe controller target logic 304-1/304-2 may be coupled to different network paths with individual NVMe queues configured/assigned by the host. The host NVMe node 303 may have logic that determines to dynamically reconfigure the NVMe queue set up, e.g., based on bandwidth issues of a certain network, a failure of an NVMe queue, failure of an NVMe controller (virtual or backend), or failure of the network itself.

Referring to FIG. 3C, a configuration is shown for NVMe queue connections provided over multiple connection levels. For example, host system 300 communicates with one or more targets via one or more computer systems. As shown, each computer system (labeled as computer system 1, computer system 2, etc.) includes its own NVMe virtual target controller logic to communicate (for example, by encapsulating NVMe commands and data in a packet that is transmitted over the network) with the host system 300, as well as its own NVMe host node logic to communicate with a corresponding target system (e.g., 302-1/302-2). In turn, each target system includes NVMe virtual controller target logic (e.g., 304-1/304-2) such as discussed with reference to FIGS. 3A and/or 3B.

In the embodiment of FIG. 3C, each NVMe queue is exposed as a disk resource at the OS level. There may be host logic such that one user space thread may be controlling one queue in some type of command-and-control user space NVMe host node program. In this embodiment, a network switch 350 can be used to transmit or broadcast NVMe admin queue commands (encapsulated in a packet to be transmitted/broadcast over the network, for example, a Fibre Channel packet) for a command-and-control type environment of multiple NVMe controllers.

There can be a copy of a file on each of the target systems that the host system may retrieve. The multi-network path of the NVMe queues shown in FIG. 3C can allow pieces or portions of the file to take whatever path to quickly arrive at the host system. The host system then reassembles the received portions of the file (e.g., received via a network controller) into a complete copy of the file on the target system(s).

Accordingly, in some embodiments, an NVMe host-target model provides one NVMe administrative queue and a plurality of NVMe 10 queues for every target-based NVMe controller. In turn, a host system has access to and/or couples with the NVMe controller. Additionally, an embodiment establishes NVMe queues such that each queue may be coupled between a host, a target, and remote NVMe-based physical storage media via independent and/or configurable network routes and attach points (see, e.g., FIG. 3C). This results in redundant and/or reconfigurable access between a host system and its assigned storage resource(s). It may also lead to an enabling of more efficient use of available storage bandwidth as well as novel computer storage network configurations that may lead to benefits in redundancy, correctness, and/or other unrealized but positive benefits.

Furthermore, the routes for each NVMe queue may be optimized based on host usage model and/or target resources. This in turn allows for a virtual storage target to configure NVMe queue connectivity for optimal access to physical storage media. As discussed herein, a "route" generally refers to a (e.g., network) path that a single NVMe IO queue can take between a host system and a target system. In addition, depending on the network fabric underlying host-target coupling, it is possible to provide network device failover in the event of network hardware and/or route failure.

Figure 4:
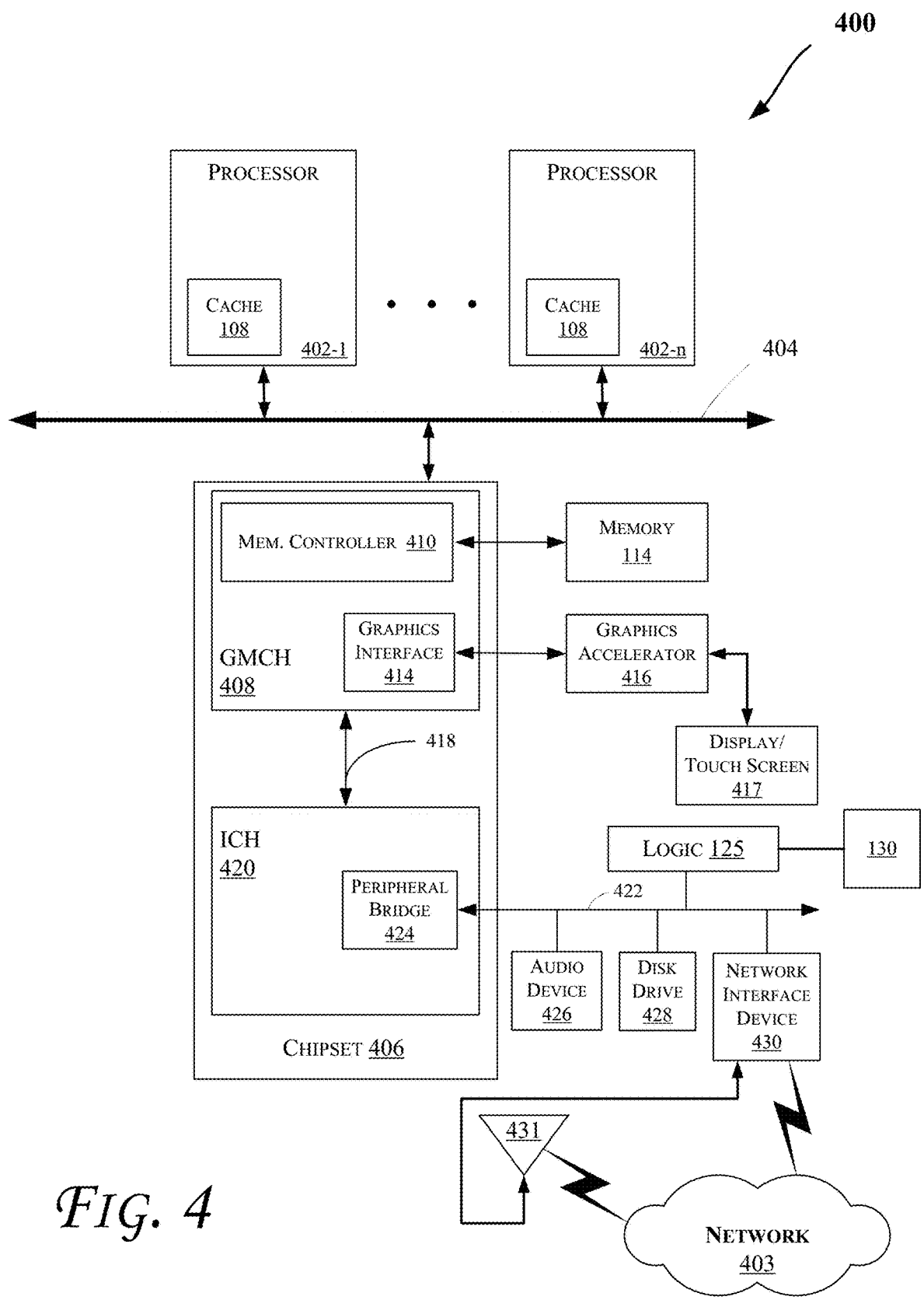

FIG. 4 illustrates a block diagram of a computing system 400 in accordance with an embodiment. The computing system 400 may include one or more central processing unit(s) (CPUs) 402 or processors that communicate via an interconnection network (or bus) 404. The processors 402 may include a general purpose processor, a network processor (that processes data communicated over a computer network 403), an application processor (such as those used in cell phones, smart phones, etc.), or other types of a processor (including a reduced instruction set computer (RISC) processor or a complex instruction set computer (CISC)). Various types of computer networks 403 may be utilized including wired (e.g., Ethernet, Gigabit, Fiber, etc.) or wireless networks (such as cellular, including 3G (Third-Generation Cell-Phone Technology or 3rd Generation Wireless Format (UWCC)), 4G (Fourth-Generation Cell-Phone Technology), 4G Advanced, Low Power Embedded (LPE), Long Term Evolution (LTE), LTE advanced, Low Power Embedded (LPE), etc.). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

In an embodiment, one or more of the processors 402 may be the same or similar to the processors 102 of FIG. 1. For example, one or more of the processors 402 may include one or more of the cores 106 and/or processor cache 108. Also, the operations discussed with reference to FIGS. 1-3F may be performed by one or more components of the system 400.

A chipset 406 may also communicate with the interconnection network 404. The chipset 406 may include a graphics and memory control hub (GMCH) 408. The GMCH 408 may include a memory controller 410 (which may be the same or similar to the memory controller 120 of FIG. 1 in an embodiment) that communicates with the memory 114. The memory 114 may store data, including sequences of instructions that are executed by the CPU 402, or any other device included in the computing system 400. Also, system 400 includes logic 125, and/or SSD 130 (which may be coupled to system 400 via bus 422, via other interconnects such as 404, where logic 125 is incorporated into chipset 406, etc. in various embodiments). In one embodiment, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk drive, flash, etc., including any NVM discussed herein. Additional devices may communicate via the interconnection network 404, such as multiple CPUs and/or multiple system memories.

The GMCH 408 may also include a graphics interface 414 that communicates with a graphics accelerator 416. In one embodiment, the graphics interface 414 may communicate with the graphics accelerator 416 via an accelerated graphics port (AGP) or Peripheral Component Interconnect (PCI) (or PCI express (PCIe) interface). In an embodiment, a display 417 (such as a flat panel display, touch screen, etc.) may communicate with the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 417.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403, e.g., via a wired or wireless interface). As shown, the network interface device 430 may be coupled to an antenna 431 to wirelessly (e.g., via an Institute of Electrical and Electronics Engineers (IEEE) 802.11 interface (including IEEE 802.11a/b/g/n/ac, etc.), cellular interface, 3G, 4G, LPE, etc.) communicate with the network 403. Other devices may communicate via the bus 422. Also, various components (such as the network interface device 430) may communicate with the GMCH 408 in some embodiments. In addition, the processor 402 and the GMCH 408 may be combined to form a single chip. Furthermore, the graphics accelerator 416 may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
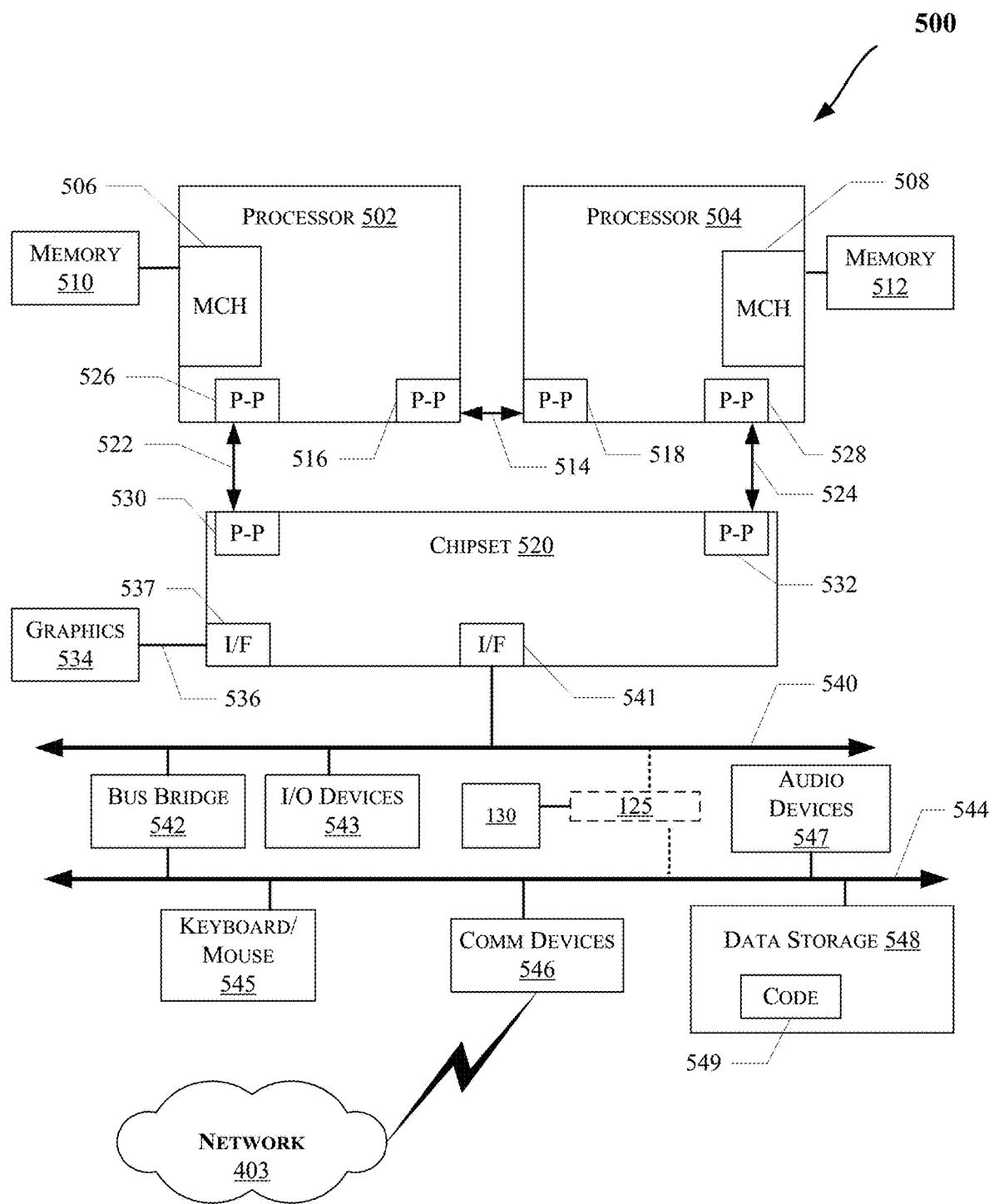

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 114 of FIGS. 1 and/or 4. Also, MCH 506 and 508 may include the memory controller 120 in some embodiments. Furthermore, system 500 includes logic 125, and/or SSD 130 (which may be accessible on network 403, or alternatively, coupled to system 500 via bus 540/544, via other point-to-point connections to the processor(s) 502/504 or chipset 520, where logic 125 is incorporated into chipset 520, etc. in various embodiments).

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537. As discussed with reference to FIG. 4, the graphics interface 536 may be coupled to a display device (e.g., display 417) in some embodiments.

In one embodiment, one or more of the cores 106 and/or processor cache 108 of FIG. 1 may be located within the processors 502 and 504 (not shown). Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403, as discussed with reference to network interface device 430 for example, including via antenna 431), audio I/O device, and/or a data storage device 548. The data storage device 548 may store code 549 that may be executed or transferred by the processors 502 and/or 504.

Figure 6:
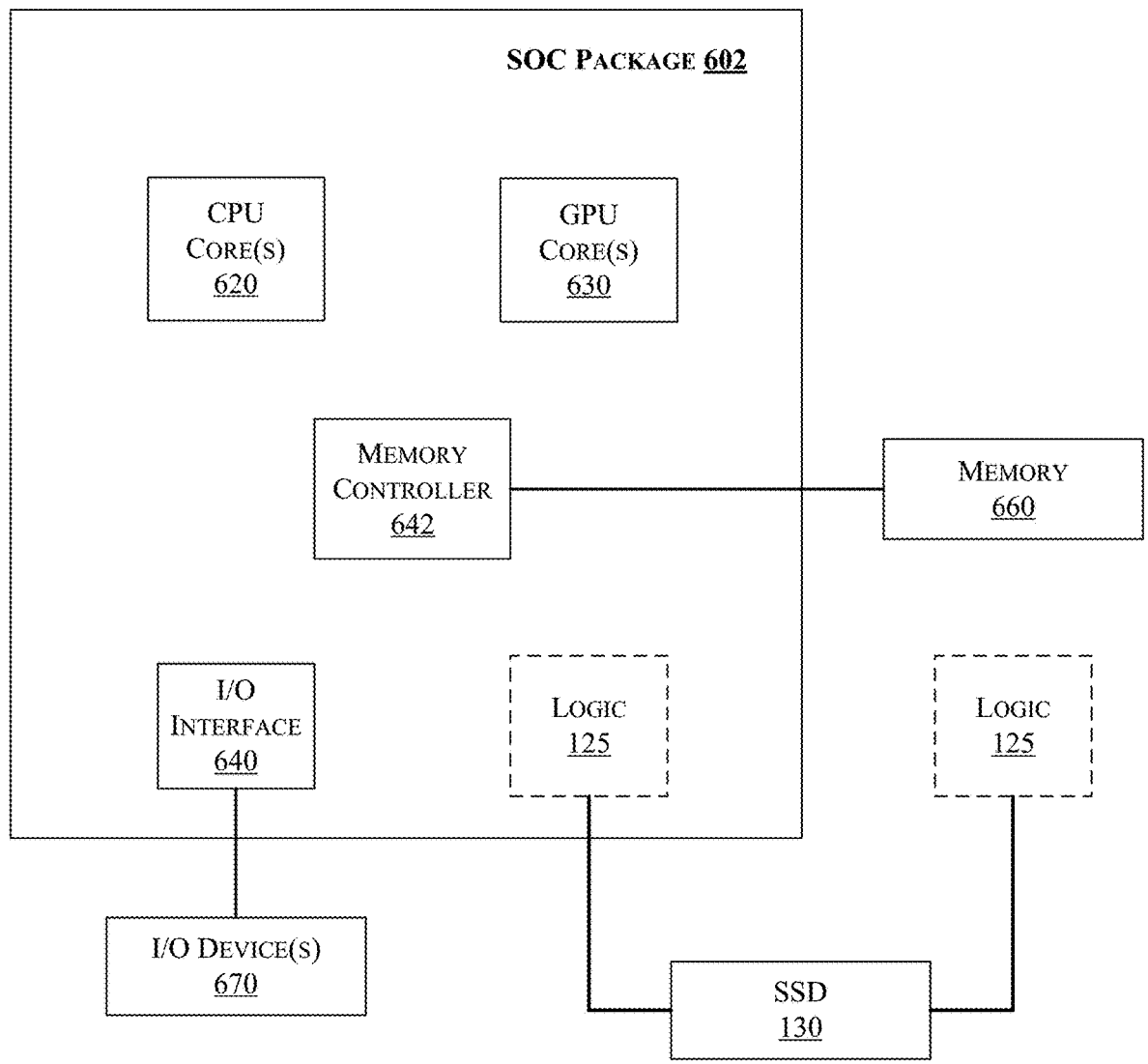

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged onto a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate items 125 and/or 130 in an embodiment. Alternatively, items 125 and/or 130 may be provided outside of the SOC package 602 (i.e., as a discrete logic).

The following examples pertain to further embodiments. Example 1 includes an apparatus comprising: a plurality of backend controller logic coupled to a plurality of non-volatile memory devices; and one or more virtual controller target logic, coupled to the plurality of backend controller logic, to transmit data from a first portion of a plurality of Input Output (TO) queues, to be transmitted from a host system, to a first backend controller logic of the plurality of the backend controller logic, wherein the one or more virtual controller target logic is to transmit data from a second portion of the plurality of IO queues to a second backend controller logic of the plurality of backend controller logic. Example 2 includes the apparatus of example 1, wherein each of the first portion and the second portion of the plurality of IO queues is to comprise about half of the plurality of IO queues. Example 3 includes the apparatus of example 1, wherein the one or more virtual controller target logic is to transmit information from an administrative queue to both the first backend controller logic and the second backend controller logic. Example 4 includes the apparatus of example 3, wherein the one or more virtual controller target logic is to transmit one or more administrative commands to the first or second backend controller logic based on information to be provided from the administrative queue. Example 5 includes the apparatus of example 1, wherein a target system is to comprise the one or more virtual controller target logic and at least one of: the first backend controller logic and the second backend controller logic. Example 6 includes the apparatus of example 1, wherein a first target system is to comprise first virtual controller target logic from the one or more virtual controller logic and the first backend controller logic, wherein a second target system is to comprise second virtual controller target logic from the one or more virtual controller logic and the second backend controller logic. Example 7 includes the apparatus of example 6, wherein the first virtual controller target logic is to transmit data from the first portion of the plurality of IO queues to the first backend controller logic of the plurality of the backend controller logic, wherein the second virtual controller target logic is to transmit data from the second portion of the plurality of IO queues to the second backend controller logic of the plurality of backend controller logic. Example 8 includes the apparatus of example 6, wherein the first virtual controller target logic and the second virtual controller target logic are to transmit information from an administrative queue to the first backend controller logic and the second backend controller logic. Example 9 includes the apparatus of example 6, wherein the first target system and the second target system are to be coupled to the host system through one or more computer systems. Example 10 includes the apparatus of example 9, comprising network switch logic to transmit information from an administrative queue, to be received from the host system, to the first target system and the second target system. Example 11 includes the apparatus of example 1, wherein the plurality of non-volatile memory devices is to include a plurality of Non-Volatile Memory express (NVMe) devices. Example 12 includes the apparatus of example 1, wherein the non-volatile memory is to comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption. Example 13 includes the apparatus of example 1, further comprising at least one network interface to communicate data with the host system.

Example 14 includes a method comprising: transmitting data, at one or more virtual controller target logic, from a first portion of a plurality of Input Output (TO) queues to a first backend controller logic of a plurality of the backend controller logic; and transmitting data, at the one or more virtual controller target logic, from a second portion of the plurality of IO queues to a second backend controller logic of the plurality of backend controller logic, wherein the plurality of IO queues are transmitted from a host system, wherein the plurality of backend controller logic is coupled to a plurality of non-volatile memory devices. Example 15 includes the method of example 14, wherein each of the first portion and the second portion of the plurality of IO queues comprises about half of the plurality of IO queues. Example 16 includes the method of example 14, further comprising the one or more virtual controller target logic transmitting information from an administrative queue to both the first backend controller logic and the second backend controller logic. Example 17 includes the method of example 14, wherein a first target system comprises first virtual controller target logic from the one or more virtual controller logic and the first backend controller logic, wherein a second target system comprises second virtual controller target logic from the one or more virtual controller logic and the second backend controller logic. Example 18 includes the method of example 14, wherein the plurality of non-volatile memory devices includes a plurality of Non-Volatile Memory express (NVMe) devices. Example 19 includes the method of example 14, wherein the non-volatile memory comprises one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption. Example 20 includes the method of example 14, further comprising at least one network interface communicating data with the host system.

Example 21 includes a computer-readable medium comprising one or more instructions that when executed on at least one a processor configure the at least one processor to perform one or more operations to: transmitting data, at one or more virtual controller target logic, from a first portion of a plurality of Input Output (TO) queues to a first backend controller logic of a plurality of the backend controller logic; and transmitting data, at the one or more virtual controller target logic, from a second portion of the plurality of IO queues to a second backend controller logic of the plurality of backend controller logic, wherein the plurality of IO queues are transmitted from a host system, wherein the plurality of backend controller logic is coupled to a plurality of non-volatile memory devices. Example 22 includes the computer-readable medium of example 21, further comprising one or more instructions that when executed on the at least one processor configure the at least one processor to perform one or more operations to cause the one or more virtual controller target logic to transmit information from an administrative queue to both the first backend controller logic and the second backend controller logic. Example 23 includes the computer-readable medium of example 21, wherein a first target system comprises first virtual controller target logic from the one or more virtual controller logic and the first backend controller logic, wherein a second target system comprises second virtual controller target logic from the one or more virtual controller logic and the second backend controller logic. Example 24 includes the computer-readable medium of example 21, wherein the plurality of non-volatile memory devices includes a plurality of Non-Volatile Memory express (NVMe) devices. Example 25 includes the computer-readable medium of example 21, wherein the non-volatile memory comprises one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption.

Example 26 includes a computing system comprising: at least one network interface to communicate with a host system; a plurality of backend controller logic coupled to a plurality of non-volatile memory devices; and one or more virtual controller target logic, coupled to the plurality of backend controller logic, to transmit data from a first portion of a plurality of Input Output (TO) queues, to be transmitted from the host system, to a first backend controller logic of the plurality of the backend controller logic, wherein the one or more virtual controller target logic is to transmit data from a second portion of the plurality of IO queues to a second backend controller logic of the plurality of backend controller logic. Example 27 includes the system of example 26, wherein each of the first portion and the second portion of the plurality of IO queues is to comprise about half of the plurality of IO queues. Example 28 includes the system of example 26, wherein the one or more virtual controller target logic is to transmit information from an administrative queue to both the first backend controller logic and the second backend controller logic. Example 29 includes the system of example 26, wherein a target system is to comprise the one or more virtual controller target logic and at least one of: the first backend controller logic and the second backend controller logic. Example 30 includes the system of example 26, wherein a first target system is to comprise first virtual controller target logic from the one or more virtual controller logic and the first backend controller logic, wherein a second target system is to comprise second virtual controller target logic from the one or more virtual controller logic and the second backend controller logic. Example 31 includes the system of example 26, wherein the plurality of non-volatile memory devices is to include a plurality of Non-Volatile Memory express (NVMe) devices. Example 32 includes the system of example 26, wherein the non-volatile memory is to comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption.

Example 33 includes an apparatus comprising means to perform a method as set forth in any preceding example. Example 34 comprises machine-readable storage including machine-readable instructions, when executed, to implement a method or realize an apparatus as set forth in any preceding claim.

In various embodiments, the operations discussed herein, e.g., with reference to FIGS. 1-6, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features, numerical values, and/or methodological acts, it is to be understood that claimed subject matter may not be limited to the specific features, numerical values, or acts described. Rather, the specific features, numerical values, and acts are disclosed as sample forms of implementing the claimed subject matter.

The invention claimed is:

1. An apparatus comprising:
   at least one processor to:
      execute an operating system (OS), wherein the OS is to provide support for access to at least one Non-Volatile Memory express (NVMe) compatible target device, wherein the NVMe compatible target device is to operate consistent at least with a Non-Volatile Memory Express Specification and wherein the at least one NVMe compatible target device provides access to at least one admin queue and at least one input output (IO) queue,
      use an NVMe host node to communicate with an NVMe compatible target device, and
      process a request from a requester to communicate with the NVMe compatible target device; and
   an interface to transmit the request in at least one Ethernet packet to a target device associated with the NVMe compatible target device.

2. The apparatus of claim 1, wherein the NVMe compatible target device is associated with one or more physical NVMe compatible controllers associated with one or more volatile or non-volatile memory devices.

3. The apparatus of claim 1, wherein the NVMe compatible target device is to appear to the requester as a single NVMe device through a single NVMe controller with a plurality of NVMe queues but data operations are directed to multiple NVMe devices.

4. The apparatus of claim 1, wherein the interface is to transmit the request to the NVMe compatible target device over a fabric.

5. The apparatus of claim 4, wherein the fabric is compatible with one or more of: Remote Direct Memory Access (RDMA), Fibre Channel, or Ethernet.

6. The apparatus of claim 1, wherein the interface is to broadcast the request to multiple NVMe compatible target devices.

7. The apparatus of claim 1, wherein the request comprises an NVMe administrative command and the NVMe administrative command comprises one or more of: Create Submission/Completion IO Queues, or Identify Controller.

8. The apparatus of claim 1, wherein the at least one NVMe compatible target device provides access to one admin queue and fifteen (15) IO queues.

9. A method comprising:
   providing operating system (OS) that provides support for access to at least one Non-Volatile Memory express (NVMe) compatible target device, wherein the NVMe compatible target device is to operate consistent at least with a Non-Volatile Memory Express Specification and wherein the at least one NVMe compatible target device provides access to at least one admin queue and at least one input output (IO) queue;
   accessing an NVMe host node to communicate with a NVMe compatible target device,
   processing a request from a requester to communicate with the NVMe compatible target device; and
   transmitting the request in at least one Ethernet packet to a target device associated with the NVMe compatible target device.

10. The method of claim 9, wherein the NVMe compatible target device is associated with one or more physical NVMe compatible controllers associated with one or more volatile or non-volatile memory devices.

11. The method of claim 9, wherein the transmitting the request in at least one Ethernet packet to a target device associated with the NVMe compatible target device comprises transmitting the request in at least one Ethernet packet to a target device associated with the NVMe compatible target device over a fabric.

12. The method of claim 11, wherein the fabric is compatible with one or more of: Remote Direct Memory Access (RDMA), Fibre Channel, or Ethernet.

13. The method of claim 9, wherein the transmitting the request comprises broadcasting the request to multiple NVMe compatible target devices.

14. The method of claim 9, wherein the request comprises an NVMe administrative command and the NVMe administrative command comprises one or more of: Create Submission/Completion IO Queues, or Identify Controller.

15. The method of claim 9, wherein the at least one NVMe compatible target device provides access to one admin queue and fifteen (15) IO queues.

16. A system comprising:
   a host computing system comprising:
      at least one memory;
      at least one processor to:
         execute a requester software;
         execute an operating system (OS), wherein the OS is to provide support for access to at least one Non-Volatile Memory express (NVMe) compatible target device, wherein the NVMe compatible target device is to operate consistent at least with a Non-Volatile Memory Express Specification and wherein the at least one NVMe compatible target device provides access to at least one admin queue and at least one input output (IO) queue,
         use an NVMe host node to communicate with a NVMe compatible target device, and
         process a request from the requester to communicate with the NVMe compatible target device; and
      an interface to transmit the request in at least one Ethernet packet to a target device associated with the NVMe compatible target device.

17. The system of claim 16, wherein the NVMe compatible target device is associated with one or more physical NVMe compatible controllers associated with one or more volatile or non-volatile memory devices.

18. The system of claim 17, wherein the non-volatile memory is to comprise one or more of: nanowire memory, Ferro-electric Transistor Random Access Memory (FeTRAM), Magnetoresistive Random Access Memory (MRAM), flash memory, Spin Torque Transfer Random Access Memory (STTRAM), Resistive Random Access Memory, byte addressable 3-Dimensional Cross Point Memory, PCM (Phase Change Memory), and volatile memory backed by a power reserve to retain data during power failure or power disruption.

19. The system of claim 16, wherein the interface is to transmit the request to the NVMe compatible target device over a fabric and the fabric is compatible with one or more of: Remote Direct Memory Access (RDMA), Fibre Channel, or Ethernet.

20. The system of claim 16, wherein the request comprises an NVMe administrative command and the NVMe administrative command comprises one or more of: Create Submission/Completion IO Queues, Identify Controller.

* * * * *